No. 743,091. PATENTED NOV. 3, 1903.
A. I. LOOP.
STRAINER ATTACHMENT FOR SPRAYING APPARATUS.
APPLICATION FILED MAY 27, 1903.
NO MODEL.

Witnesses.
F. J. Bassett
F. L. Stockert.

Inventor.
Admah I. Loop
By L. C. & H. M. Sturgeon
Attys.

No. 743,091. Patented November 3, 1903.

UNITED STATES PATENT OFFICE.

ADMAH I. LOOP, OF NORTHEAST, PENNSYLVANIA, ASSIGNOR OF ONE-HALF TO ROICE S. PIERCE AND GEO. E. PIERCE, DOING BUSINESS AS PIERCE BROS., OF NORTHEAST, PENNSYLVANIA.

STRAINER ATTACHMENT FOR SPRAYING APPARATUS.

SPECIFICATION forming part of Letters Patent No. 743,091, dated November 3, 1903.

Application filed May 27, 1903. Serial No. 159,000. (No model.)

*To all whom it may concern:*

Be it known that I, ADMAH I. LOOP, a citizen of the United States, residing at Northeast, in the county of Erie and State of Pennsylvania, have invented certain new and useful Improvements in Strainer Attachments for Spraying Apparatus; and I do hereby declare the following to be a full, clear, and exact description of the invention, such as will enable others skilled in the art to which it appertains to make and use the same, reference being had to the accompanying drawings and to the letters of reference marked thereon, forming part of this specification.

My invention relates to strainer attachments for spraying apparatus; and it consists substantially in a strainer mechanism so attached to the spraying apparatus that the spraying fluid passes through it on its way to the spraying-nozzles.

In the spraying fluids ordinarily used there is more or less sediment, which causes much trouble in obstructing the spraying-nozzles, so that they have to be frequently detached and cleaned. To overcome this difficulty, I have devised a strainer mechanism in which there is a fine strainer-screen, below which there is a sediment-chamber and an inlet for the fluid which passes upward through the screen to the spraying-hose, and in the bottom of the sediment-chamber there is an outlet closed by a cock which can be opened and the sediment in the chamber discharged, so that all of the sediment is stopped by the screen and falls into the chamber and is from there discharged.

The features of my invention are hereinafter fully set forth and described, and illustrated in the accompanying drawings, in which—

Figure 1:
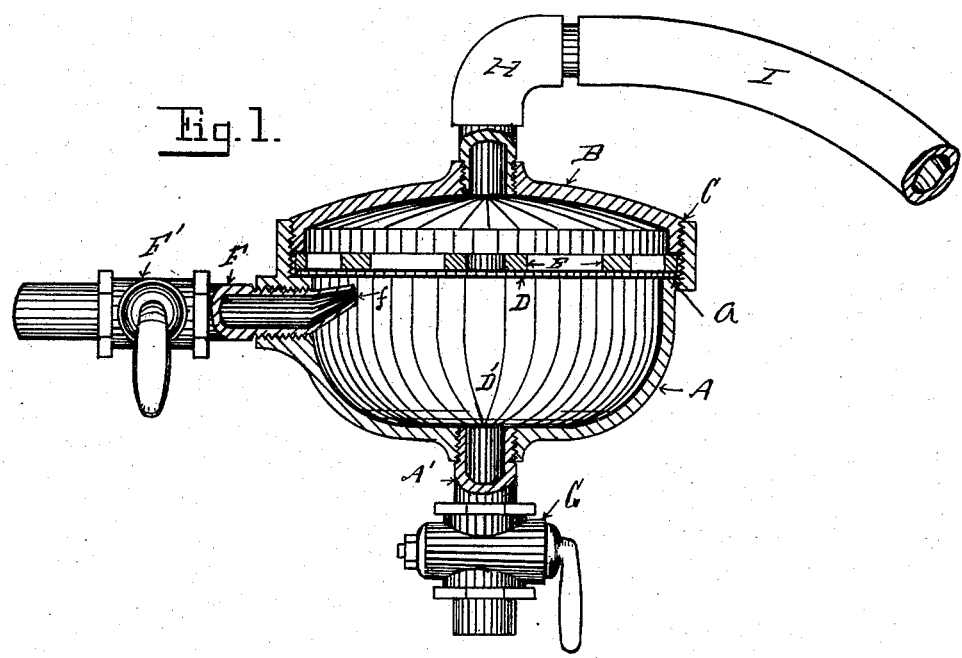
Figure 2:
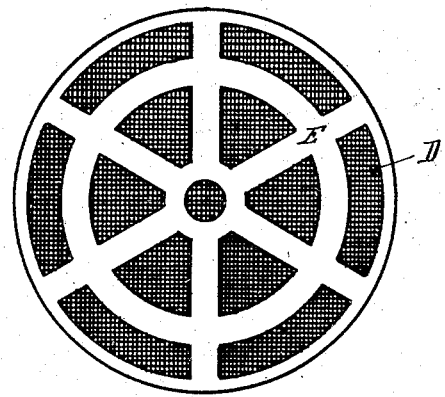

Figure 1 is a central vertical section of my device. Fig. 2 is a plan view of the screen and grating over it removed from the device.

In the drawings illustrating my invention, A is the lower section, and B the upper section, of the strainer-casing, preferably connected by a screw-joint C, and resting on the annular shoulder $a$ of the section A, I place a disk of fine wire-gauze screening D, and on the top of this screen D, I place a removable skeleton disk E, having numerous openings therein, and when the upper section B is screwed down upon these parts D and E, as illustrated in Fig. 1, they are held firmly in place and the skeleton disk E supports the gauze-disk D against the pressure of the fluid passing up through it. In one side of the section A, a short distance below the strainer-screen D, I secure an inlet-pipe F, provided with a shut-off cock F'. The inner end $f$ of the pipe F is flattened somewhat and so directed as to discharge the fluid passing in from the pipe F across the lower surface of the strainer D, which operates to throw off therefrom any particles of sediment tending to adhere thereto, which particles then fall down into the bottom of the chamber D' formed by the lower portion of the section A, where they are retained until they are discharged through the outlet-pipe A' by opening the shut-off cock G therein. In the central part of the upper section B, I secure an elbow-nipple H, to which a spraying-hose I is secured provided with the usual spraying-nozzles. (Not shown.) In operation the pipe E is connected to a tank (not shown) containing spraying fluid under suitable pressure, and when the cock F'' is opened the fluid passes out of the end $f$ thereof across the under surface of the gauze-screen D and up through the screen D and grating E and out through the outlet H and spraying-hose I, while the sediment is stopped by the gauze-screen D and falls down into the sediment-chamber D' in the lower part of the section A, where it is retained until drawn off through the pipe A' by opening the cock G.

Having thus fully described my invention so as to enable others to construct and use the same, what I claim as new, and desire to secure by Letters Patent of the United States, is—

1. The combination in a strainer attachment for spraying apparatus, of a casing, a strainer-screen therein, an inlet-pipe entering the casing at one side below the strainer-screen having its inner end upwardly turned so as to discharge against and transversely across the under surface of the strainer-screen, and an outlet-pipe in said casing above the strainer-screen, substantially as and for the purpose set forth.

2. The combination in a strainer attachment for spraying apparatus of a casing consisting substantially of upper and lower sections, a removable strainer-screen secured between said upper and lower sections, a sediment-chamber below said screen, an outlet-pipe in said casing above the screen and an inlet-pipe entering said casing at one side thereof below the screen, and an upwardly-turned inner end on said inlet-pipe directing the discharge therefrom against and across the under surface of the strainer-screen, substantially as and for the purpose set forth.

In testimony whereof I affix my signature in presence of two witnesses.

ADMAH I. LOOP.

Witnesses:
 EZRA MALICK,
 E. GREEN.